US010017393B2

United States Patent
Yoon et al.

(10) Patent No.: US 10,017,393 B2
(45) Date of Patent: Jul. 10, 2018

(54) METHOD OF FABRICATING ARRAY OF NANOPARTICLE CLUSTERS USING THERMAL TRANSFORMATION OF SUBLIMABLE LIQUID CRYSTAL FILM

(71) Applicant: KOREA ADVANCED INSTITUTE OF SCIENCE AND TECHNOLOGY, Daejeon (KR)

(72) Inventors: Dong Ki Yoon, Daejeon (KR); Dae Seok Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 312 days.

(21) Appl. No.: 14/927,926

(22) Filed: Oct. 30, 2015

(65) Prior Publication Data

US 2016/0355405 A1 Dec. 8, 2016

(30) Foreign Application Priority Data

Jun. 2, 2015 (KR) .................. 10-2015-0078204

(51) Int. Cl.
*C01B 33/14* (2006.01)
*C09K 19/12* (2006.01)
*C09K 19/04* (2006.01)

(52) U.S. Cl.
CPC .......... *C01B 33/14* (2013.01); *C09K 19/12* (2013.01); *C09K 2019/044* (2013.01); *C09K 2019/122* (2013.01); *C09K 2219/00* (2013.01); *C09K 2219/03* (2013.01)

(58) Field of Classification Search
None
See application file for complete search history.

(56) References Cited

U.S. PATENT DOCUMENTS

| 2004/0235199 | A1 | 11/2004 | Jung et al. | |
| 2009/0087582 | A1* | 4/2009 | Watanabe | B81C 1/00031 427/558 |
| 2009/0275826 | A1* | 11/2009 | Enzerink | B32B 3/26 600/424 |

FOREIGN PATENT DOCUMENTS

| KR | 10-0548017 B | 1/2006 |
| KR | 10-0548017 B1 | 1/2006 |
| KR | 10-2012-0055517 A | 5/2012 |

OTHER PUBLICATIONS

Yoon et al., Internal structure visualization and lithographic use of periodic toroidal holes in liquid crystals, nature materials, vol. 6, Nov. 2007, 866-870.*
Cheng et al., Nanopatterning self-assembled nanoparticle superlattices by moulding microdroplets, nature nanotechnology, vol. 3, Nov. 2008, pp. 682-690.*

(Continued)

*Primary Examiner* — James Mellott
(74) *Attorney, Agent, or Firm* — Hultquist, PLLC; Steven J. Hultquist

(57) ABSTRACT

The present invention relates to a method for fabricating an array of nanoparticle clusters, in which a thermally transformable organic liquid crystal film having a periodic array of micro-sized dimple-like defect structures spontaneously transformed by thermal sublimation of liquid crystal molecules is used as a template, and nanoparticles form self-assembled clusters having a uniform size with respect to the defect structures, thereby achieving a periodic array of nanoparticle clusters.

9 Claims, 6 Drawing Sheets

(56) References Cited

OTHER PUBLICATIONS

Yoon et al., Three-dimensional textures and defects of soft material layering revealed by thermal sublimation, PNAS, Nov. 2013, pp. 19263-19267.*
Kim, et al., Fabrication of periodic nanoparticle clusters using a soft lithographic template, J. Mater. Chem. C, 2015, 3, 4598.*
Wikipedia: Octadecyltrimethoxysilane, last viewed on Apr. 18, 2018.*
Sugimura, Organosilane self-assembled monolayers formed at the vapour/solid interface, Surf. Interface Anal. 2002, 34, 550-554.*
Kim, K., et al., "Photoenhancement of a quantum dot nanocomposite via UV annealing and its application to white LEDs", "Advanced Materials", Dec. 27, 2010, pp. 911-914, vol. 23.
Kim, D., et al., "Fabrication of periodic nanoparticle clusters using a soft lithographic template", "Journal of Materials Chemistry C", Apr. 8, 2015, pp. 4598-4602, vol. 3.

* cited by examiner

METHOD OF FABRICATING ARRAY OF NANOPARTICLE CLUSTERS USING THERMAL TRANSFORMATION OF SUBLIMABLE LIQUID CRYSTAL FILM

CROSS-REFERENCE TO RELATED APPLICATION

The priority of Korean Patent Application No. 10-2015-0078204 filed Jun. 2, 2015 is hereby claimed under the provisions of 35 USC 119. The disclosure of Korean Patent Application no. 10-2015-0078204 is hereby incorporated herein by reference, in its entirety, for all purposes.

TECHNICAL FIELD

The present invention relates to a method for fabricating a sublimable liquid crystal film and a method of fabricating an array of nanoparticle clusters using thermal transformation of the sublimable liquid crystal film, and more particularly, to a method for fabricating a sublimable liquid crystal film, in which a liquid crystal film spontaneously transformed by thermal sublimation of liquid crystal molecules is fabricated and used to induce self-assembled nanoparticle clusters, thereby achieving a periodic array of nanoparticle clusters, and to a method of fabricating an array of nanoparticle clusters by thermal transformation of a sublimable liquid crystal film.

BACKGROUND ART

As one of promising methods for fabricating functional nanostructures showing specific structural and electro-optical characteristics, a self-assembly method allowing a stable structure to be spontaneously formed based on the thermodynamic stability of basic units constituting the structure has received attention in the field of nano science and technology for the past decades. As basic units suitable for this self-assembly method, various units, including small molecules having a size of angstroms (A), biomaterials such as DNAs or proteins, and colloidal nanoparticles, have been used in this method. Of such units, nano- or micro-sized organic or inorganic particles can produce uniform particles having a size ranging from nanometers to micrometers, which can overcome the resolution limit of existing optical lithography technology, and the unit particles themselves have specific electro-optical characteristics. For this reason, these organic or inorganic particles are receiving considerable attention as unit materials for nano- and micro-structures. In order to maximize the characteristics of self-clusters of such nanoparticles and use these self-clusters for substantial applications, it is particularly important to create an array of uniform self-clusters over a large area.

For this purpose, various techniques, including drying oil-emulsion template in water, electrostatic assembly, chemical vapor deposition, and template-assisted assembly, have been reported by leading research groups in Korea and other countries. Nevertheless, a complex process employing expensive equipment is required to achieve a uniform array of nanoparticle clusters over a large area.

Accordingly, the present inventors have made extensive efforts to overcome the above-described problems, and as a result, have found that, when a sublimable supermolecular liquid crystal material is used as a template for inducing self-clustering, a uniform array of nanoparticle clusters over a large area can be achieved, thereby completing the present invention.

DISCLOSURE OF INVENTION

It is an object of the present invention to provide a method for fabricating a liquid crystal film and an array of nanoparticle clusters, in which a pattern can be formed very quickly over a large area because of the high mobility of the film and the fabrication process is simple and cost-effective. Another object of the present invention is to provide a method for fabricating an array of nanoparticle clusters, which can also be applied to optoelectrical functional nanoparticles such as quantum dots and can realize next-generation flexible electronic and optical devices by applying an array of nanoparticle clusters to a flexible substrate.

To achieve the above objects, the present invention provides a method for fabricating a liquid crystal film, the method comprising a step of thermally annealing a sublimable liquid crystal supermolecule on a substrate.

The present invention also provides a method for fabricating an array of nanoparticle clusters, the method comprising the steps of: (a) thermally annealing a sublimable liquid crystal supermolecule on a substrate, and cooling the thermally annealed supermolecule to induce periodic microdefect structures, thereby forming a liquid crystal film on the substrate; and (b) allowing nanoparticles to form self-assembled clusters with respect to the defect structures using the formed liquid crystal film as a template.

BEST MODE FOR CARRYING OUT THE INVENTION

Unless defined otherwise, all technical and scientific terms used herein have the same meaning as commonly understood by one of ordinary skill in the art to which the invention pertains. Generally, the nomenclature used herein and the experiment methods, which will be described below, are those well known and commonly employed in the art.

In the present invention, it could be seen that, when regular micro-defect structures formed by spontaneous self-assembly of organic monomolecules are used as a template, the self-assembly of nanoparticles can be induced using the template that is transformed by sublimation during thermal annealing, and thus a pattern can be formed quickly to form a regular array, and a film can also be formed even on a flexible substrate, indicating that the aspect of various arrays of clusters of functional nanoparticles such as quantum dots can be easily controlled.

Therefore, in one aspect, the present invention is directed to a method for fabricating a liquid crystal film, the method comprising a step of thermally annealing a sublimable liquid crystal supermolecule on a substrate.

In the present invention, the substrate may be selected from the group consisting of silicon, polydimethylsiloxane (PDMS), glass, ITO (indium tin oxide), and graphene films, but is not limited thereto.

Preferably, the substrate may be chemically modified with polyethyleneimine, polyethylene glycol (PEG), silica or octadecyltrimethoxysilane (OTS), and the chemical modification may be performed using a spin-coating method or a self-assembled monolayer (SAM) technique.

The liquid crystal supermolecules that are used in the present invention can be uniformly organized due to their physicochemical functionality. In addition, because their assembly at the molecular level is caused by reversible physical interactions, these molecules spontaneously form thermodynamically most stable structures and behave so as to minimize defect structures. This spontaneous self-association at the molecular level requires a relatively small amount of energy, and is very strong in that delicate micro-processes in angstroms (Å) units are possible even by very simple environmental control only. In addition, these molecules have the property of subliming into air in the liquid crystal state, and structural transformation of self-clusters thereof is caused by the sublimation and reconstruction of supermolecular liquid crystals during thermal annealing in the liquid crystal state.

As mentioned throughout the specification, the term "sublimation" refers to vaporization in the liquid crystal state.

Figure 1:
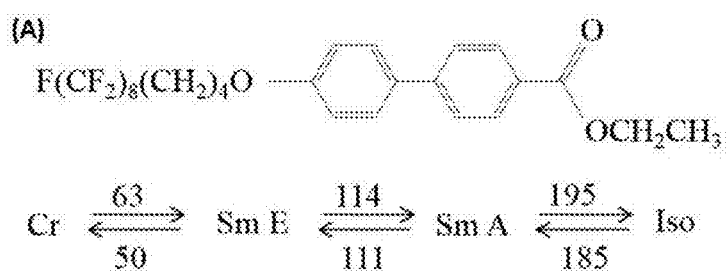
FIG. 1 shows: (A) a rod-type liquid crystal molecule used in the present invention, in which a fluorinated carbon chain and an ester group are bonded at both ends of a biphenyl ring, respectively, and the temperature-dependent phase transition of the liquid crystal molecule; (B) an electron microscope top view of liquid crystal defect structures formed by the liquid crystal molecule used; and (C) and (D), top views taken by an electron microscope after and 2 hours of annealing, respectively, and showing the transformation of liquid crystal defect structures caused by thermal annealing at 160° C. in the smectic phase.
Figure 1:
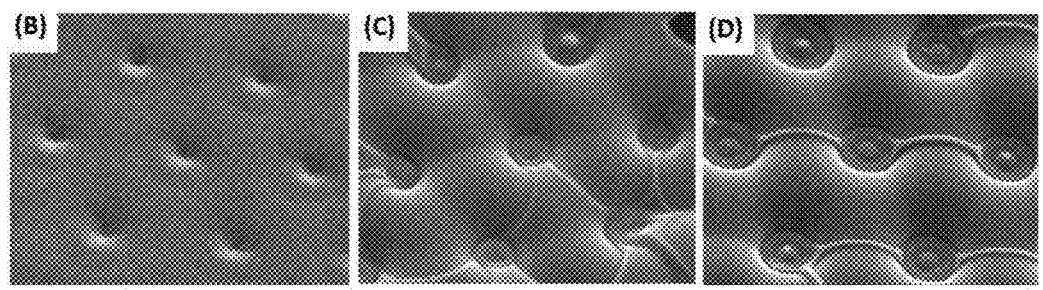

The supermolecular liquid crystal material used in the present invention is a rod-type molecule (A) containing a fluorine group, as shown in FIG. 1, and primarily forms a layered structure. The liquid crystal supermolecule may be a rod-type liquid crystal molecule in which a fluorinated carbon chain and an ester group are bonded at both ends of a biphenyl ring. Preferably, it may be a material represented by the following formula 1:

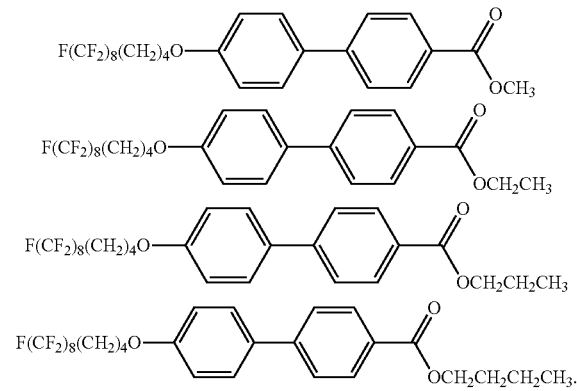

Formula 1

In another aspect, the present invention is directed to a method of fabricating an array of nanoparticle clusters by thermal transformation of a liquid crystal film formed by thermally annealing a sublimable liquid crystal supermolecule on a substrate.

In a preferred embodiment, the present invention is directed to a method for fabricating an array of nanoparticle clusters, the method comprising the steps of: (a) thermally annealing a sublimable liquid crystal supermolecule on a substrate, and cooling the thermally annealed supermolecule to induce periodic micro-defect structures, thereby forming a liquid crystal film on the substrate; and (b) allowing nanoparticles to form self-assembled clusters with respect to the defect structures using the formed liquid crystal film as a template.

The periodic micro-defect structures can be spontaneously transformed by thermal sublimation of the liquid crystal supermolecule, and step (b) may comprise dropping a nanoparticle solution onto the liquid crystal film, drying the dropped solution, followed by annealing at the liquid crystal phase temperature.

In the present invention, when the liquid crystal supermolecule is located at the interface between two different materials (i.e., hydrophilic substrate and air), it will be aligned horizontally near the substrate surface and aligned vertically as it is closer to air. Thus, the orientation of the molecule at the interface forms a curvature, and the sheet structure is aligned tangentially, thereby forming unique defect structures known as toric focal conic domains (hereinafter referred to as TFCDs), and is stabilized over a large area. Such specific defect structures are generally measured to have a size of micrometers (2-20 μm), and the size is determined according to the thickness of a sample. If a sample having a uniform thickness can be made based on such a fundamental idea, it will generally have TFCD structures having the same size. Herein, the TFCD structures (B) have a perforated shape like a dimple (FIG. 1). When such structures are thermally annealed at the temperature of the smectic A (Sm A) phase, the rate of sublimation in a single TFCD is expressed unevenly because of energy inequality attributable to the layered structures bent with respect to the torus-shaped TFCD defect structures. The rate of sublimation is higher as it goes away from the defect structures, and the molecules in the exposed layered structures reorient vertically, resulting in reconstruction of the layered structures. As a result, as shown in FIG. 1, in (C) and (D) therein, 3-dimensional nanosized hemicylindrical structures form concentric dome-like structures with the defect structures. When various physicochemical environments are controlled using this sublimation-reconstruction phenomenon, new three-dimensional functional nanostructures can be patterned over a large area, and the internal structure thereof can be observed without physically splitting the sample.

The present invention is a novel technology in which nanoparticles are assembled into single clusters using the sublimable supermolecular liquid material as a template that transforms based on self-clustering while nanoparticle clusters are regularly arrayed over a large area by the macroscopic reorientation of liquid crystal defects.

The present invention is a novel technology in which nanoparticles can be clustered into single structures based on the sublimation property of liquid crystal molecules, which was not discussed in the prior art, while an array of the structures can be induced. Specifically, liquid crystal molecules that form periodic defect structures under specific conditions spontaneously form nanoparticle structures due to the sublimation and reconstruction properties of the molecules together with interactions between nanoparticles during thermal annealing at the temperature of the liquid crystal phase thereof. In the present invention, the positions of formation of the structures are consistent with the positions of formation of the liquid crystal molecule defect structures, and thus an array thereof can be determined. In addition, various combinations of the kind of nanoparticles and the kind of substrate on which liquid crystal defect structures are realized enable the fabrication of elements and devices capable of exhibiting desired physical properties by use of general possible technology.

A prior art technology for forming uniform nanoparticle structures and a periodic array of the structures required the use of a complex process and expensive equipment. In addition, a process reduced to a simple process for this reason could not provide good results. However, according to the present invention, defect structures which are formed under specific environments using liquid crystal molecules having a self-assembly property are used as a guiding template, and nanoparticle clusters are spontaneously formed by the sublimation property of the liquid crystal molecules. Thus, the present invention is easy and simple, but results in a considerably uniform and periodic array of nanoparticle structures. In addition, because the present invention can be applied regardless of the kind of nanoparticles and the kind of substrate on which liquid crystal defect structures are realized, it makes it possible to develop an element and device based on specific nanoparticle structures having desired physical properties.

Figure 2:
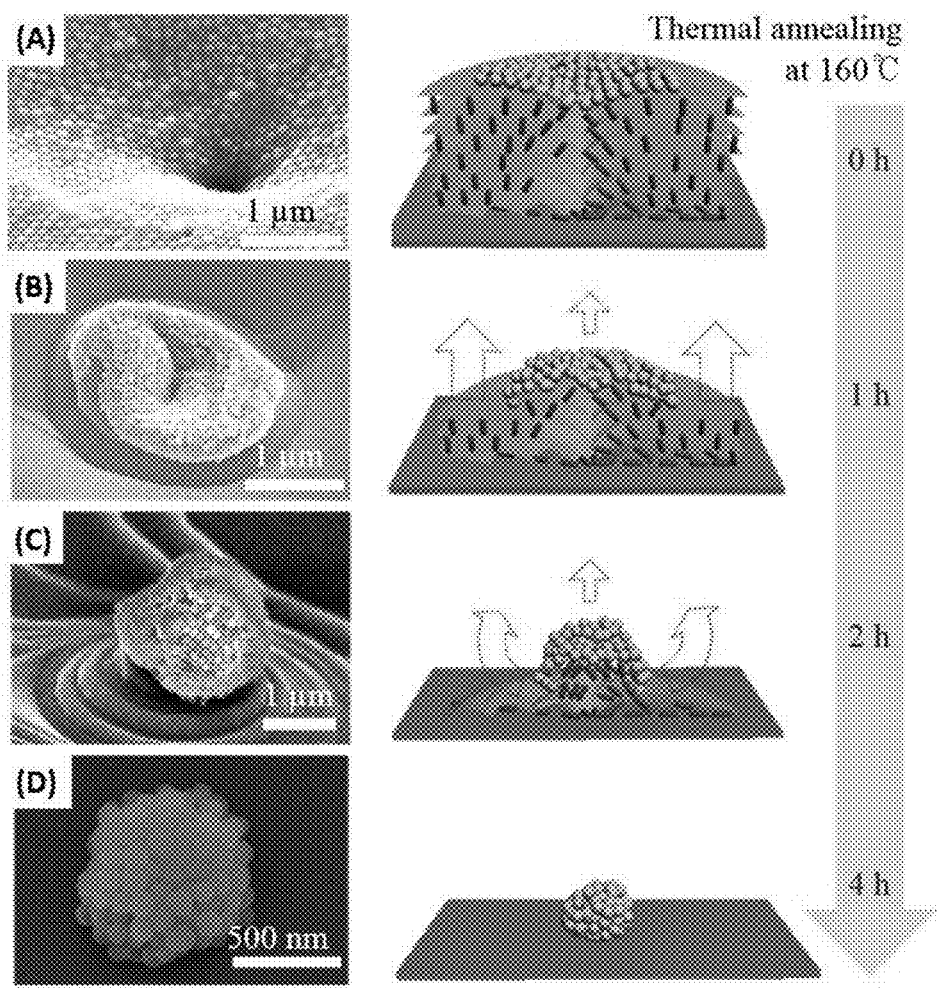
FIG. 2 shows: (A) an electron microscope image of a single defect structure, taken after F—$SiO_2$ nanoparticles were coated on a liquid crystal film, and a cross-sectional view of the defect structure; (B) and (C), electron microscope images of single defect structures thermally annealed at 160° C. in the smectic phase under atmospheric conditions for 1 and 2 hours, respectively, and cross-sectional views of the single defect structures; and (D) an electron microscope image of a spherical cluster of nanoparticles, formed in a state in which a liquid crystal molecule was completely removed from a substrate by sublimation after 4 hours of thermal annealing.

Important factors in the process of the present invention are topographical dimpled structures of TFCDs, as well as the above-mentioned sublimation and reconstruction phenomenon of the TFCDs. Such topographical dimpled defect structures have a depth of 2-200 nm, preferably about 200 nm, together with a width of 500 nm-2 μm, preferably 2 μm. This provides a confinement system to effectively confine nanoparticles. To verify this concept, the liquid crystal molecule used in the present invention, and a solution having dispersed therein fluorinated silica (hereinafter referred to as F—SiO$_2$) nanoparticles, were spin-coated on a TFCD film. As a result, as can be seen in (A) of FIG. 2, F—SiO$_2$ nanoparticles having a diameter of 100 nm were primarily gathered in the dimpled region of the defect structures. FIG. 2 shows an electron microscope image (A) of a single defect structure, taken after F—SiO$_2$ nanoparticles were coated on a liquid crystal film, and a cross-sectional view of the defect structure. As can be seen therein, the coated nanoparticles gradually aggregate round with the defect structure by the sublimation of liquid crystal molecules during annealing at the smectic phase temperature (160° C.), thereby forming a nanoparticle cluster in which most of the nanoparticles are confined in the dimple-like defect structure. Because of the nanoparticles covering the surface of the defect structure in this procedure, the difference in sublimation rate in the TFCD is more remarkable. Specifically, because the nanoparticles interfere with the direct contact between the molecules of the defect structure surface and air to prevent the molecules from subliming into air, the portion around the defect structure sublimes faster into air, and thus the layered structure of the defect structure portion is transformed into a spherical shape together with the nanoparticles. The molecules of the defect structure portion whose sublimation was inhibited by the nanoparticles form a mixture with the nanoparticles while the layered structure is distorted by planar anchoring to the nanoparticle surface.

Figure 3:
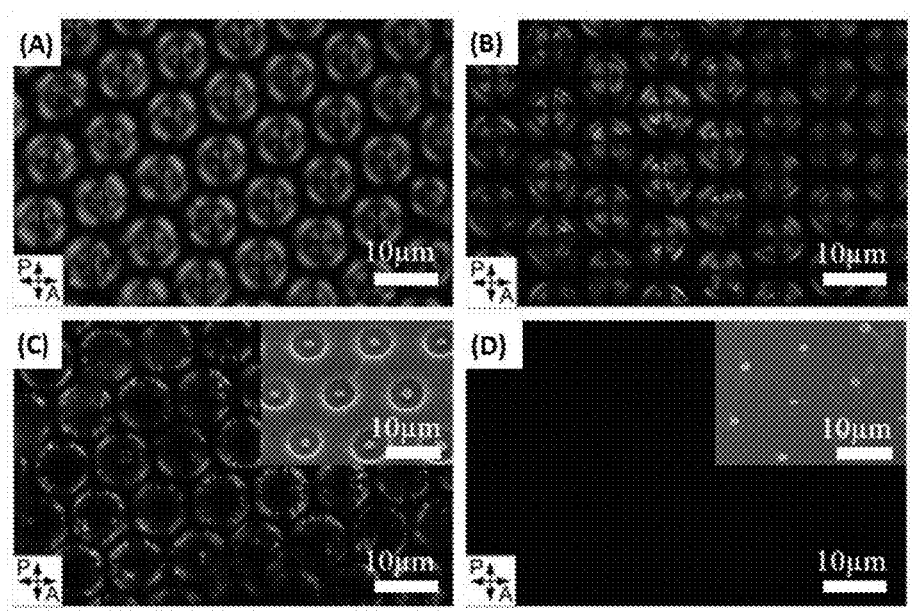
FIG. 3 shows processes ranging from deposition of F—$SiO_2$ nanoparticles on the liquid crystal film TFCD to formation of spherical clusters by thermal annealing, including: (A) a polarizing microscope image before thermal annealing; (B) a polarizing microscope image after 1 hour of thermal annealing; (C) a polarizing microscope image after 2 hours of thermal annealing; and (D) a polarizing microscope image after 4 hours of thermal annealing. The images inserted in (C) and (D) are electron microscope images corresponding to the polarizing microscope images.

This is an important process by which clusters of dense particles can be formed after liquid crystal molecules were completely removed by sublimation. FIG. 3 shows the results of observing the above-described nanoparticle cluster formation process with a polarizing microscope. As can be seen therein, the central portion of TFCDs loses its birefringence property during thermal annealing. This supports "the layered structure of the defect structure portion is distorted" as mentioned above.

Figure 4:
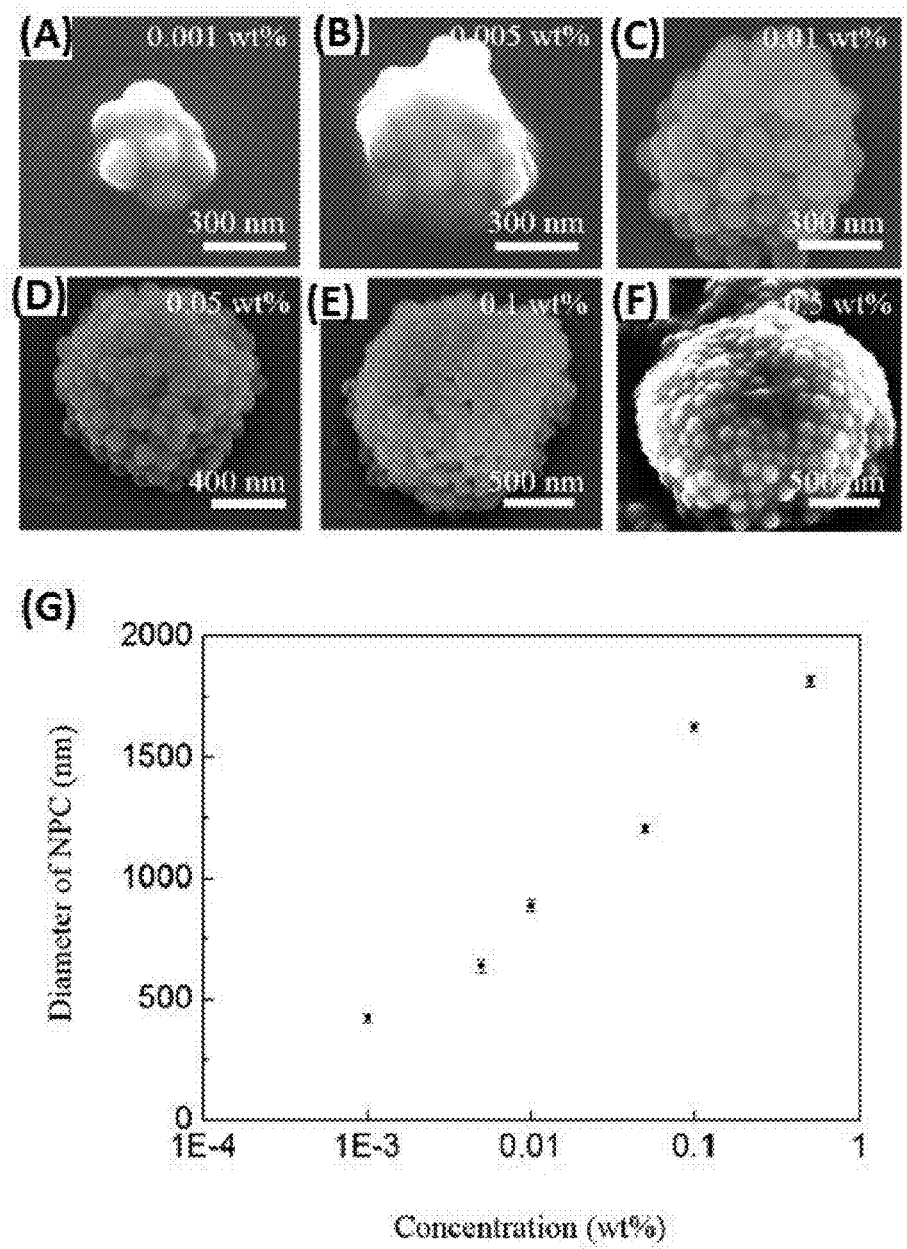
FIG. 4 includes: electron microscope images (A)-(F) showing that the size of F—$SiO_2$ nanoparticle clusters consistently increases as the concentration of F—$SiO_2$ nanoparticle solution increases from 0.001 wt % to 0.5 wt %; and a graph (G) showing the change in the size of nanoparticle clusters as a function of the concentration of nanoparticle solution, in which the x-axis of the graph is the log-scale concentration of the nanoparticles, and the y-axis is the diameter of the nanoparticle clusters.

According to the present invention, the size of nanoparticle clusters can be controlled depending on the concentration of nanoparticles in a nanoparticle solution. As shown in FIG. 4, as the concentration of the F—SiO$_2$ nanoparticle solution increases from 0.001 wt % to 0.5 wt %, the size of nanoparticle clusters increases from 400 nm to 1.8 μg with a relatively uniform size. Because the structure and physical properties of nanoparticles significantly change depending on the number of nanoparticles clustered, a system capable of controlling the size of nanoparticle clusters can provide a platform suitable for the research of electro-optical or structural characteristics that depend on the size of nanoparticle clusters.

In the present invention, the nanoparticles may be silica nanoparticles, quantum dots, metal nanoparticles such as silver nanoparticles, metal nanorods such as silver nanorods, or quantum rods.

Figure 5:
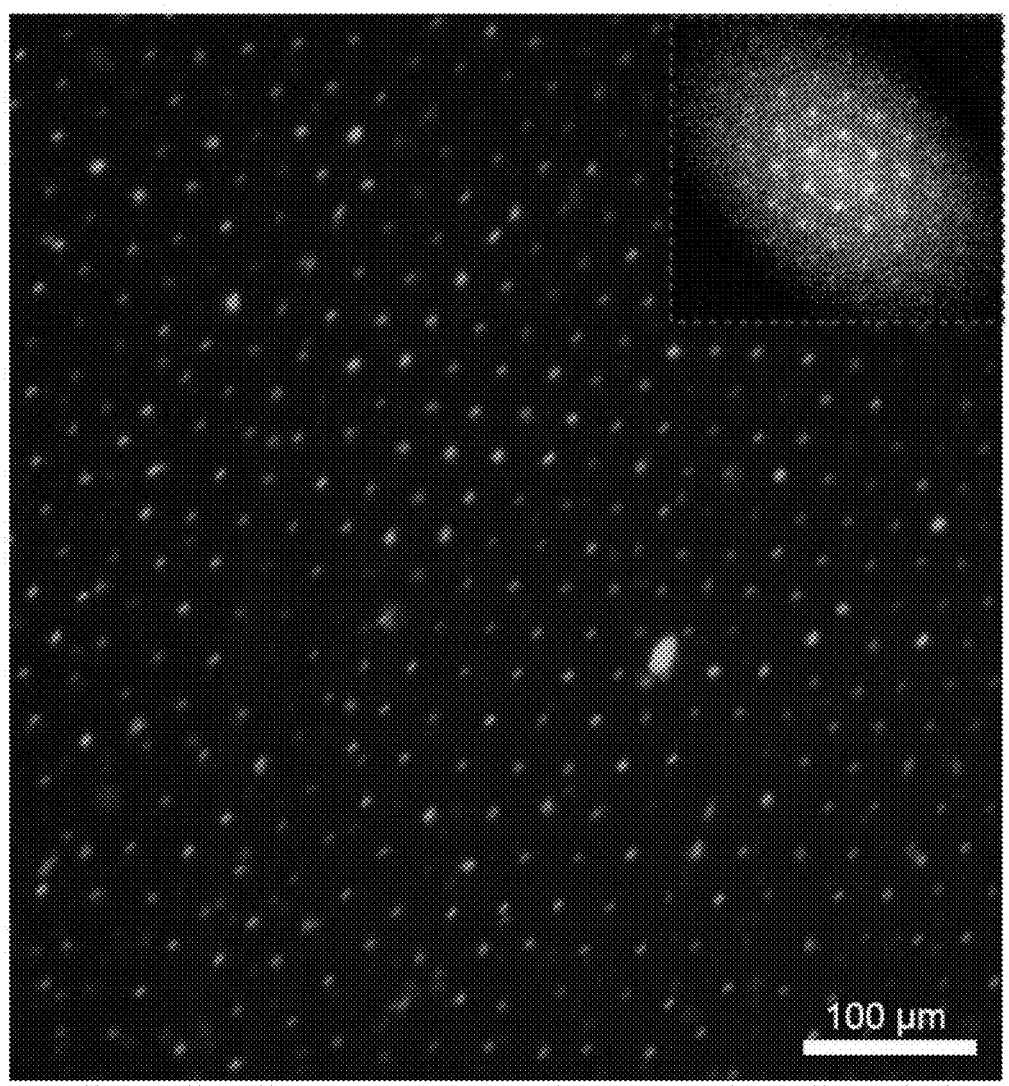
FIG. 5 is a fluorescence microscope image showing that a hexagonal array of clusters of quantum dots that are functional nanoparticles was achieved over a large area in an example of the present invention; and the image inserted in FIG. 5 is a fast Fourier transform (FFT) image and shows the high regularity of arrayed quantum-dot clusters.

To demonstrate the versatility of the present invention, quantum dots that are functional materials receiving attention in optoelectronic materials, in addition to the above-mentioned F—SiO$_2$ nanoparticles, can be used in the present invention. The quantum dots used in the present invention comprise a multi-shell structure of CdSe/CdS/ZnS and have a diameter of 4-5 nm. The quantum dots show a maximum absorption at about 450 nm (blue) and emission at about 550 nm. As shown in FIG. 5, quantum-dot clusters forming a hexagonal array in a large area of about 1 mm$^2$ were observed with a fluorescence microscope, and from the insert in FIG. 5, which is a fast Fourier transform (FFT) image, it was found that the quantum-dot clusters had a significantly uniform array. In addition, through simple surface treatment of a substrate on which self-clustering of the supermolecular liquid crystal molecules is performed, it is possible to form defect structures on various kinds of substrate. For example, nanoparticle clusters can also be formed on a highly flexible polydimethylsiloxane (PDMS) substrate. The above two results show that the fabrication of a flexible substrate having a uniform array of functional optoelectronic nanoparticles is possible. In the current electronic industry and material field, the realization of flexible electronic devices that are next-generation technology is urgently needed, and thus examples of the present invention will have considerable ripple effects. In the hexagonal array spontaneously formed on the TFCD film using the sublimable liquid crustal supermolecules according to the present invention, an array of the defect structures can be formed as a one-dimensional or two-dimensional array using a topographical pattern. Thus, the aspect of various arrays of clusters of functional nanoparticles such as quantum dots can be easily controlled.

EXAMPLES

Hereinafter, the present invention will be described in further detail with reference to examples. It will be obvious to a person having ordinary skill in the art that these examples are illustrative purposes only and are not to be construed to limit the scope of the present invention. Thus, the substantial scope of the present invention will be defined by the appended claims and equivalents thereof.

Example 1: Synthesis of Liquid Crystal Molecules and Nanoparticles

As a main materials, fluorinated rod-type liquid crystal supermolecules, F—$SiO_2$ nanoparticles, and multishell quantum dots (CdSe/CdS/ZnS) were prepared based on the synthesis method reported in "K. Kim, J. Y. Woo, S. Jeong and C. S. Han, Adv. Mater., 2011, 23, 911".

Formation of Liquid Crystal Film on Substrate

A cleaned silicon substrate was exposed to oxygen plasma (100 W; running time: 2 min) to provide a substrate environment rich in active electrons. Then, the substrate surface was chemically modified with a glycol functional group using polyethyleneimine (Mw 60,000; Aldrich) by a spin coating technique (4500 rpm, 45 sec). This process provides an environment capable of horizontally orienting molecules to be clustered on the substrate (that is, capable of inducing high interactions with the conjugated electrons of the molecules), thereby determining the orientation of the molecules anchored on the substrate.

Figure 7:
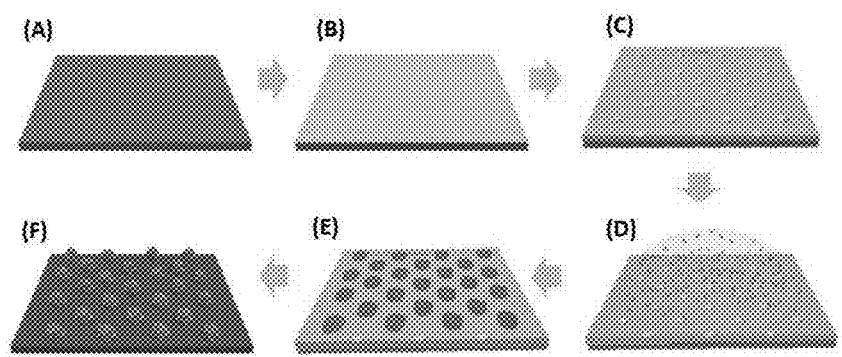
FIG. 7 shows sequential processes (A)-(F) for forming an array of nanoparticle clusters according to the present invention.

The powder-type synthesized liquid crystal molecule placed on the chemically modified substrate was heated to an isotropic temperature of 195° C. or higher on a hot stage (Linkam LTS350) to reach a liquid phase, and then a temperature environment controlled to a uniform cooling rate of 10° C./min was operated (Linkam TMS94), thereby inducing a stepwise phase transition. In addition, nano-micro mixed structures (i.e., TFCDs) that are controlled in a specific direction by the substrate/air interface effect were formed over a large area, as shown in (A)-(C) in FIG. 7.

Formation of Spherical Clusters of F—$SiO_2$ Nanoparticles

It was found that the defect structures at room temperature was in a hard crystal state in which the dimpled topographical defect structures of TFCDs formed in the smectic phase were maintained. As shown in (D) to (E) in FIG. 7, 50 µl of 0.01 wt % F—$SiO_2$ nanoparticle solution was dropped onto the formed liquid crystal film, and then nanoparticles were deposited on the surface of the film by a spin-coating technique (2000 rpm, 15 sec), after the film was naturally dried until the solvent would be completely removed. The dried sample was placed on a hot stage (Linkam LTS350), and annealed with a temperature controller (Linkam TMS94) at a smectic A phase temperature of 160° C. for 4 hours, thereby forming a regular array of spherical clusters of F—$SiO_2$ nanoparticles, and the array was observed with an electron microscope.

As can be seen in (A) in FIG. 2, when the solution having fluorinated silica (hereinafter referred to as F—$SiO_2$) nanoparticles dispersed therein was spin-coated on the TFCD film, F—$SiO_2$ nanoparticles having a diameter of 100 nm were primarily gathered in the dimpled portion of the defect structure. The coated nanoparticles gradually aggregated round with respect to the defect structure together with sublimation of the liquid crystal molecules during annealing at the smectic phase temperature (160° C.), thereby forming a nanoparticle cluster in which most of the nanoparticles were confined in the dimple-like defect structure.

Observation of Change in Size of Clusters as a Function of Concentration of Nanoparticle Solution As shown in FIG. 4, as the concentration of the F—$SiO_2$ nanoparticle solution increased from 0.001 wt % to 0.5 wt %, the size of nanoparticle clusters increases from 400 nm to 1.8 µg while the clusters had a relatively uniform size.

Example 2: Formation of Spherical Clusters of F—$SiO_2$ Nanoparticles on Flexible Substrate An array of nanoparticle clusters was formed in the same manner as described in Example 1, except that a PDMS was used instead of the silicon substrate. The array was observed with an electron microscope, and the results of the observation are shown in FIG. 6.

Figure 6:
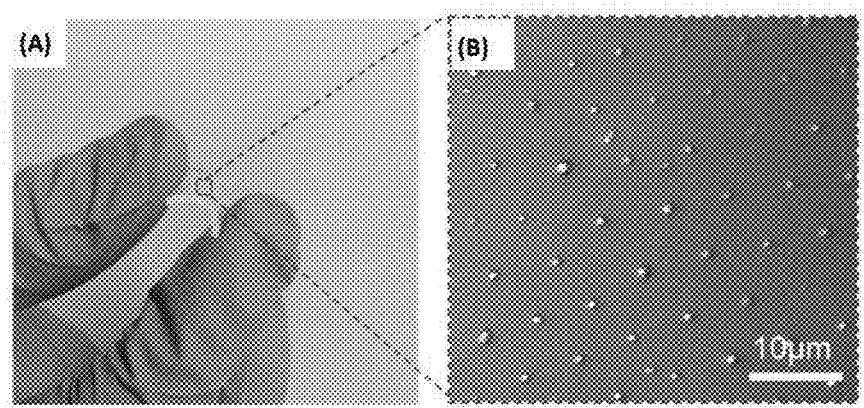
FIG. 6 includes: an image (A) showing a bent PDMS substrate having F—SiO$_2$ nanoparticle clusters arrayed thereon according to the present invention; and a photograph (B) showing a regular hexagonal array of F—SiO$_2$ nanoparticle clusters formed on a PDMS substrate.

As shown in FIG. 6, an array of nanoparticle clusters could also be formed on a highly flexible polydimethylsiloxane (PDMS) substrate.

Example 3: Formation of Spherical Clusters of Quantum Dot Nanoparticles

A hexagonal array of spherical clusters was formed over a large area in the same manner as described in Example 1, except that 7 mg/ml of a quantum-dot (CdSe/CdS/ZnS) nanoparticle solution was used instead of the F—$SiO_2$ nanoparticle solution.

As shown in FIG. 5, quantum-dot clusters forming a hexagonal array over a large area of about 1 $mm^2$ were observed with a fluorescence microscope. From the insert in FIG. 5, which is a fast Fourier transform (FFT) image, it was found that the quantum-dot clusters had a significantly uniform array.

Experimental Example: Observation of Formation of Nanoparticle Clusters

Observation was performed based on overall microscopy. For real-time examination of micro-sized repeat structures that are transformed during heat annealing, the optical characteristics of liquid crystal molecules were observed using a polarizing microscope (LV 100-POL, Nikon) equipped with a temperature controller (hot stage). For stepwise observation of topographical characteristics in the formation process, 4 identical samples were prepared, and sputter-coated with platinum (Pt) particles to a uniform thickness of about 3-4 nm at room temperature before thermal annealing and after 1, 2 and 4 hours of thermal annealing, after which each of the samples was observed using an electron microscope (FE-SEM, Hitachi, S-4800) with an electron beam at 7 kV and 7 mA. Observation of quantum nanoparticle clusters was performed using a fluorescence microscope (LV-UDM, Nikon) equipped with a fluorescence filter at an excitation wavelength of 440-460 nm and an emission wavelength of 540-560 nm.

INDUSTRIAL APPLICABILITY

According to the present invention, periodic defect structures of sublimable liquid crystal molecules are transformed into three-dimensional hierarchical nanostructures based on the sublimation and reconstruction phenomenon during thermal annealing. The defect structures in the liquid crystal film can very quickly form a pattern over a large area because of their high mobility, and the fabrication process is simple and cost-effective. In the present invention, the defect structures in the sublimable liquid crystal film can be used as an assembly medium, and nanoparticles irregularly placed on the defect structures of the film can be formed into single spherical clusters, and at the same time, a regular array of the clusters can be induced over a large area.

In addition, the present invention can also be applied to optoelectrical functional nanoparticles such as quantum dots, and thus can have technical ripple effects in the electronic material and industrial fields.

Because the sublimable liquid crystal molecules can also form a film even on a highly flexible substrate, an array of nanoparticle clusters can be applied to a flexible substrate, and the present invention can have a significant influence on the technology of realizing next-generation flexible electronic devices and optical devices.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method for fabricating an array of nanoparticle clusters comprising the steps of:
   (a) thermally annealing a sublimable liquid crystal supermolecule on a substrate, and cooling the thermally annealed supermolecule to induce periodic micro-defect structures, thereby forming a liquid crystal film on the substrate;
   (b) allowing nanoparticles to form self-assembled clusters with the defect structures as their center by using the formed liquid crystal film as a template; and
   (c) dropping a nanoparticle solution onto the liquid crystal film, drying the dropped solution, followed by annealing at liquid crystal phase temperature,
   wherein the nanoparticles are selected from the group consisting of silica nanoparticles, quantum dots, metal nanorods, and quantum rods, and the nanoparticles are confined in the defect structure.

2. The method of claim 1, wherein the periodic microdefect structures are spontaneously transformed by thermal sublimation of the liquid crystal supermolecule.

3. The method of claim 1, wherein the defect structures are toric focal conic domains (TFCDs).

4. The method of claim 1, wherein the defect structures have a topographical dimpled feature with a width of 500 nm-2 μm and a depth of 20-200 nm.

5. The method of claim 1, wherein the size of nanoparticle clusters varies depending on a concentration of the nanoparticle solution.

6. The method of claim 1, wherein the liquid crystal supermolecule is a rod-type liquid crystal molecule in which a fluorinated carbon chain and an ester group are bonded at both ends of a biphenyl ring, respectively.

7. The method of claim 1, wherein the liquid crystal supermolecule is represented by a following formula 1:

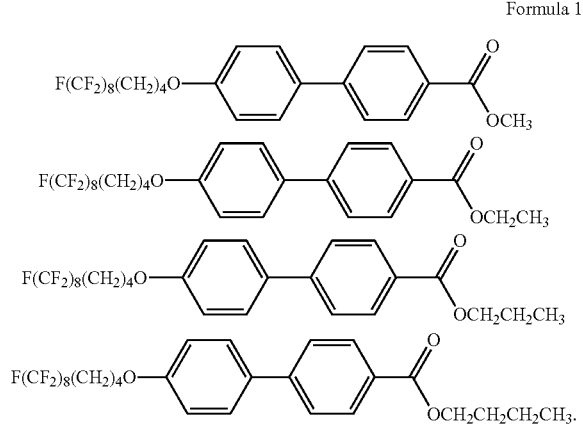

Formula 1

8. The method of claim 1, wherein the substrate is selected from the group consisting of silicon, polydimethylsiloxane (PDMS), glass, ITO (indium tin oxide), and graphene films.

9. The method of claim 1, wherein the nanoparticle clusters are three-dimensional hierarchical nanostructures.